US008847816B2

(12) United States Patent
Feil (10) Patent No.: US 8,847,816 B2
(45) Date of Patent: Sep. 30, 2014

(54) CALIBRATION OF A RADAR UNIT WITH DEVICE-SPECIFIC CORRECTION CURVES

(75) Inventor: Peter Feil, Ulm (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 603 days.

(21) Appl. No.: 13/122,203

(22) PCT Filed: Aug. 12, 2009

(86) PCT No.: PCT/EP2009/060409
§ 371 (c)(1),
(2), (4) Date: Apr. 1, 2011

(87) PCT Pub. No.: WO2010/040584
PCT Pub. Date: Apr. 15, 2010

(65) Prior Publication Data
US 2011/0181458 A1 Jul. 28, 2011

(30) Foreign Application Priority Data

Oct. 6, 2008 (DE) .......................... 10 2008 050 117

(51) Int. Cl.
*G01S 7/40* (2006.01)
*G01S 13/08* (2006.01)

(52) U.S. Cl.
USPC .......................................... 342/174; 342/128

(58) Field of Classification Search
USPC ........................... 342/124, 128, 174, 192, 200
See application file for complete search history.

(56) References Cited

U.S. PATENT DOCUMENTS

2005/0001761 A1   1/2005   Kliewer

FOREIGN PATENT DOCUMENTS

| DE | 43 27 333 A1     | 2/1995  |
| DE | 698 34 710 T2    | 5/2007  |
| DE | 10 2006 058852 A1 | 6/2008 |
| EP | 0 499 952 A1     | 8/1992  |
| EP | 0 887 658 A1     | 12/1998 |
| EP | 0 963 561 B1     | 12/1999 |
| EP | 1 933 117 A2     | 6/2008  |

OTHER PUBLICATIONS

Kehrbeck, J. et al: "A novel and Inexpensive Short Range FM-CW Radar Design" Radar 92. International Conference Brighton, UK, London, UK, IEE, UK, Jan. 1, 1992, Seiten 288-291, XP006514819 ISBN: 978-0-85296-553-5.
Leonhard, Reindl et al: "Design, Fabrication, and Application of Precise SAW Delay Lines Used in an FMCW Radar System" IEEE Transactions on Microwave Theory and Techniques, IEEE Service Center, Piscataway, NJ, US, Bd. 49, Nr. 4, Apr. 1, 2001, XP011038312.
Fuchs, J. et al: "Simple techniques to correct for VCO nonlinearities in short range FMCW radars" International Microwave Symposium Digest, IEEE MTT-S 1996, San Francisco, CA, USA, Bd. 2, Jun. 17-21, 1996 Seiten 1175-1178, XP002576677 (Cat. No. 96CH35915) IEEE New York, NY, USA.
German Search Report, Issued on Apr. 12, 2010.
International Search Report, Issued on Apr. 12, 2011.

*Primary Examiner* — Dao Phan
(74) *Attorney, Agent, or Firm* — Bacon & Thomas, PLLC (57) ABSTRACT

A method for lessening disturbances of a measurement signal in a radar unit for distance measurement by means of frequency-modulated radar in continuous wave operation. The method comprises steps of: registering, in a reference measurement, a reference signal as a function of time; deriving an error correction signal from the registered reference signal, wherein the error correction signal predominantly comprises spectral components caused or influenced by device-specific defects of the radar unit; registering a measurement signal; and correcting the measurement signal in accordance with the error correction signal by means of digital signal processing.

4 Claims, 6 Drawing Sheets

CALIBRATION OF A RADAR UNIT WITH DEVICE-SPECIFIC CORRECTION CURVES

TECHNICAL FIELD

The invention relates to a method for lessening disturbances of a measurement signal in a radar unit to a signal evaluating unit for a radar unit, as well as a radar unit with a transmitting branch and a receiving branch.

BACKGROUND DISCUSSION

In the case of radar units which work according to the FMCW (Frequency Modulated Continuous Wave) principle, a series of different kinds of disturbances occur in the received signal. Cause for such disturbances is, for example, that the signal strength varies across the sent frequency ramp, that device-internal signal over-couplings and signal reflections occur, etc. Moreover, by the signal production and frequency responses of the components used, effects are caused which result in corresponding disturbances in the received signal.

In European patent EP 0963561 B1, a sensor system is described, in the case of which a reference signal comparable with the measurement signal is produced by means of an internal delay system. At all points in time, at which this reference signal has a defined phase, e.g. a zero passing, the measurement signal is stored preferably in digitized form. These values of the measurement signal can then be evaluated independently of the defective fluctuations of the phase, which are brought about by the signal source or other components of the apparatus.

In published US-patent application US2005/0001761, a method for linearizing the non-linear, ramp-shaped curve of the transmission frequency in the case of FMCW radar units is described. The method includes a step of correcting a phase term on the receiver side of the FMCW radar device. The correction serves to compensate for a phase error in the received signal. In such case, the correction term for compensation of the phase error is determined iteratively. The iteration is stopped, when the parameters, in the case of sequential iterations, change by less than a predetermined limit value $\epsilon$.

SUMMARY OF THE INVENTION

An object of the invention is to provide for a radar unit a method for lessening disturbances, as well as a signal evaluating unit, which enable an effective correction of device-internally caused errors.

The method of the invention for lessening disturbances of a measurement signal in a radar unit for distance measuring by means of frequency modulated radar in continuous wave operation includes steps of registering in a reference measurement a reference signal as a function of time; deriving an error correction signal from the registered reference signal, wherein the error correction signal predominantly comprises spectral components which are caused or influenced by device-specific defects of the radar unit; registering a measurement signal; and correcting the measurement signal in accordance with the error correction signal by means of digital signal processing.

In radar units which work according to the FMCW (Frequency Modulated Continuous Wave) principle, a number of device-internal errors typically occur, which degrade the received signal and make difficult an evaluation of the target frequency components.

For elimination of these device-specific defects, a reference measurement is performed and a reference curve registered, which shows the respective defects of the radar unit. From this reference curve can then be derived—for example, via filtering—an error correction signal, which can then be used for correction of particular errors. For example, those spectral ranges, which are influenced by the respective errors, can be isolated or distinguished in the error correction signal.

The error correction signal thus ascertained can then be applied for correcting measurement signals. By means of digital signal processing, the corrupted regions of the measurement signal can especially be corrected with the assistance of the error correction signal. As result, a corrected measurement signal of improved quality is received. In this way, especially a more exact analysis of the target frequency components contained in the measurement signal is enabled.

In an advantageous form of embodiment, the method of the invention is applied for lessening close-range disturbance signal fractions. In such case, the method comprises the steps of registering the reference signal; deriving the error correction signal from the registered reference signal, wherein the error correction signal has close-range disturbance signal fractions but no target frequency components; registering the measurement signal; and producing a corrected measurement signal with a lessened amount of close-range disturbance signal fractions by subtraction of the error correction signal from the measurement signal.

Low-frequency disturbance signal fractions, which also are also referred to as "close-range clutter", can, for example, arise through device-internal over-couplings or signal reflections. For lessening or eliminating these low-frequency disturbance signal fractions, from a registered reference signal, an error correction signal is derived, which has only the low-frequency disturbance signal fractions. This can be obtained, for example, via a low-pass filtering.

By means of digital signal processing, the close-range clutter can then be eliminated by phase-true subtraction of the error correction signal. In this way, the disturbance signal fractions which superimpose on the target frequencies in the close-up range are eliminated. After the performance of such a zero calibration, the target frequencies in the close-up range especially can be analyzed better and with a higher sensitivity than before.

In another advantageous form of embodiment, the method of the invention is applied for dispersion correction of a measurement signal. In such case, the method comprises the steps of registering the reference signal, which has a defined target frequency component, which is caused by an individual target; deriving at least one error correction signal for the correction of device-specific dispersion errors from the registered reference signal; registering the measurement signal; and correcting the measurement signal in accordance with the at least one error correction signal; and producing a measurement signal corrected of the device-specific dispersion error by means of digital signal processing.

Measurement signal amplitude errors and phase errors varying as a function of frequency are referred to as dispersion errors. Dispersion errors can arise, for example, as a result of non-linearities in the frequency ramp curve of the transmission signal; however, they can also arise as a result of the frequency responses of the used components. For lessening or eliminating these dispersion errors, a reference signal is registered, which includes a target frequency component caused by an individual target. From this reference signal, one or more error correction signals for correction of amplitude errors and/or phase errors can be derived. By means of digital signal processing, the dispersion error of registered measurement signals can be corrected in accordance with these error correction signals.

In this manner, a corrected measurement signal is produced, which, for example, has a constant signal amplitude or a linearly rising phase. The corrected measurement signal is better evaluable and enables a more exact analysis of the target frequency components.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
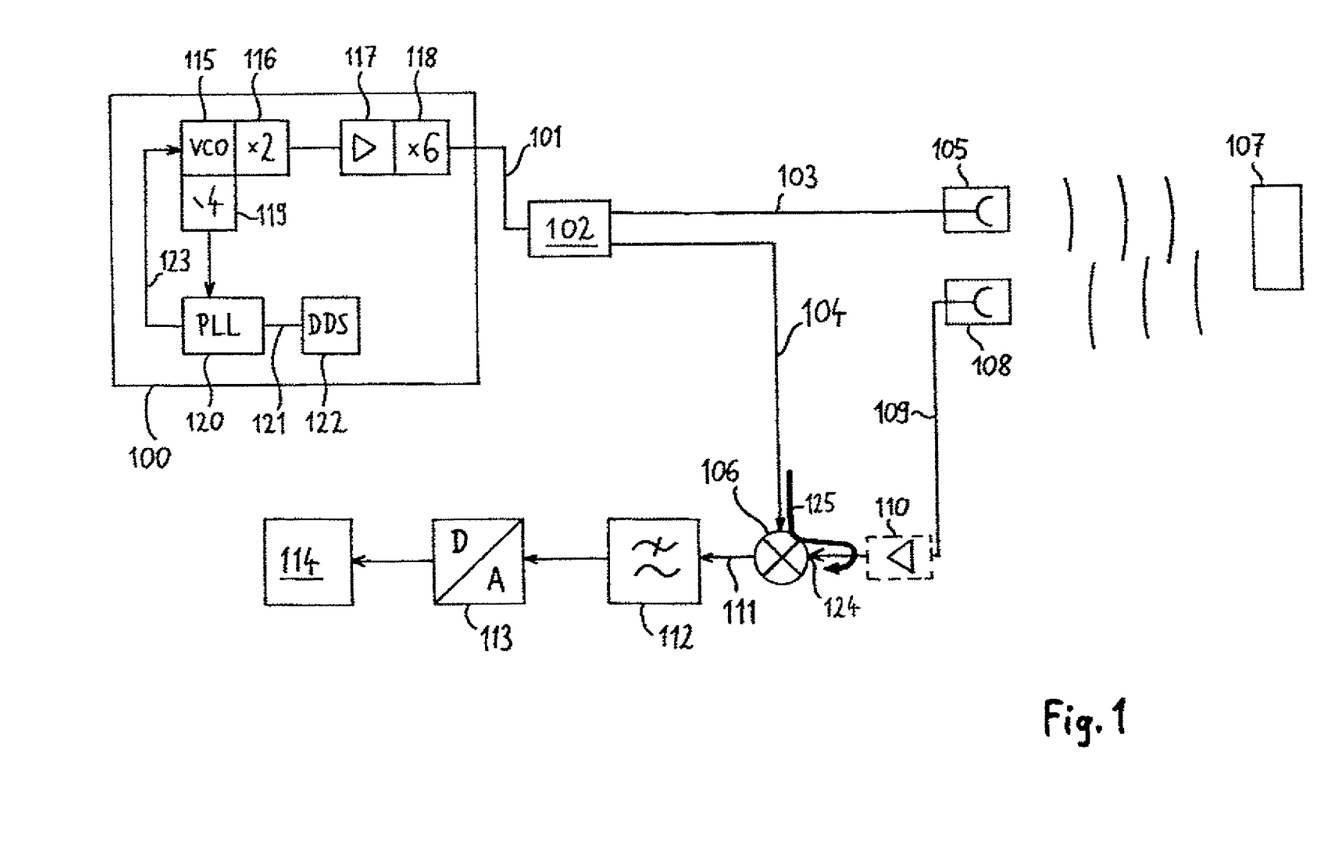
FIG. 1 is a block diagram of a radar unit working according to the FMCW principle.

FIG. 1 shows a block diagram of a radar unit working according to the FMCW (Frequency Modulated Continuous Wave) principle. The transmitting branch of the radar unit includes a high frequency source 100, which produces a frequency modulated transmission signal 101. The frequency-modulated transmission signal 101 is fed to a three gate element 102 and is divided there into a first transmission signal component 103 and a second transmission signal component 104. The first transmission signal component 103 is delivered to a transmission gate 105 and radiated out as a radar signal via an antenna. The second transmission signal component 104 serves as a local oscillator signal and is fed to the mixer 106.

Figure 2:
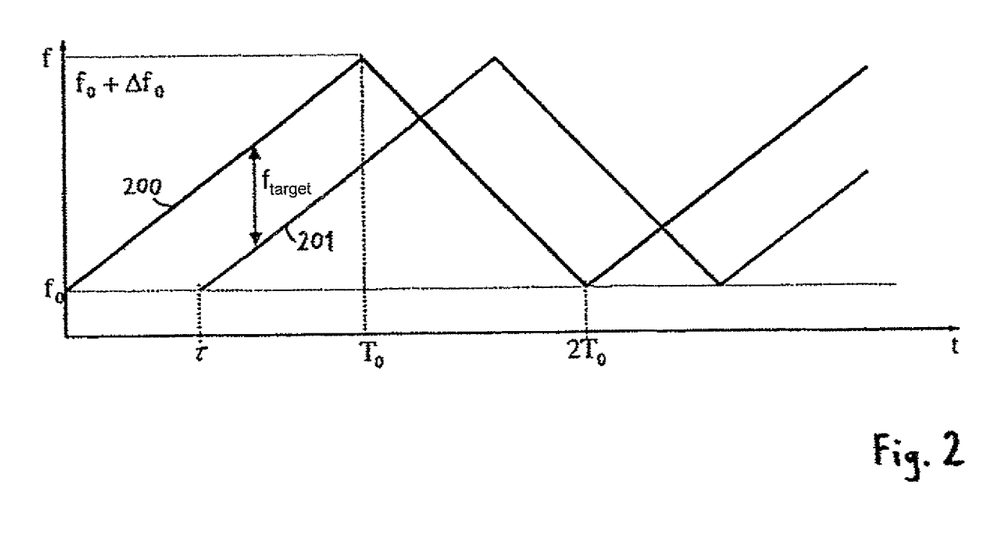
FIG. 2 shows the frequency of the transmission and received signals plotted as a function of time.

FIG. 2 shows frequency of the frequency-modulated transmission signal 200 as a function of time. The frequency of the transmission signal 200 alternately linearly rises and sinks, so that, as a whole, a triangular curve results. During a first modulation period of duration $T_0$, the frequency of the transmission signal increases linearly from the frequency $f_0$ to the frequency $f_0+\Delta f_0$, wherein the quantity $\Delta f_0$ is referred to as the frequency sweep. During a following, second modulation period of duration $T_0$, the frequency, starting from $f_0+\Delta f_0$, is brought back linearly to $f_0$. As an alternative to the triangular curve, the frequency of the transmission signal could also have a sawtooth-shaped frequency curve.

The frequencies of radar-transmission signals lie, for example, in a range of, for instance, 5 GHz to 100 GHz. The frequency sweep $\Delta f_0$ can be, for example, several GHz. The duration of the modulation period can be selected, for example, from the range between, for instance, 0.1 msec and 5 msec. These data serve only as an illustration of typical orders of magnitude; however, solutions outside of these ranges are also possible.

As is shown in FIG. 1, a part of the radiated transmission signal is reflected back to the radar unit by a target 107 located at a distance R from the radar unit. The reflected signal is received by the antenna of the radar unit and reaches the receiving gate 108. The received signal 109 is possibly amplified by an amplifier 110 (drawn dashed). Then, the received signal is fed to the mixer 106, which the mixes the received signal with the transmission signal component 104. At the output of the mixer 106, an intermediate frequency signal 111 is obtained.

For the path from the transmission gate 105 to the target 107 and back to the receiving gate 108, the radar signal requires a travel time t, which can be represented as $$\tau = \frac{2 \cdot R}{c},$$

wherein R refers to the target distance and c to the speed of light.

FIG. 2 shows, in addition to the transmission signal 200, also the received signal 201, time delayed by the travel time $\tau$. During the travel time $\tau$ required by the radar signal, the transmission signal 200 produced by the signal generator continues to rise, so that the frequency of the transmission signal instantaneously radiated is higher than the frequency of the received signal. As a result of the travel time $\tau$ of the radar signal, there consequently results a frequency difference between the transmission and received signals characteristic for the travel time $\tau$—and therewith characteristic for the distance to the target—which is referred to as the target frequency $f_{target}$. The target frequency $f_{target}$ is likewise indicated in FIG. 2.

The target frequency $f_{target}$ can be derived from the frequency sweep $\Delta f_0$, the duration $T_0$ of modulation period of the transmission signal and the travel time $\tau$. The resulting expression for target frequency $f_{target}$ is as follows:

$$f_{target} = \frac{\Delta f_0}{T_0} \cdot T = \frac{\Delta f_0}{T_0} \cdot \frac{2 \cdot R}{c}.$$

Since the variables $\Delta f_0$, $T_0$, c are constant, there results a direct proportionality between the target frequency $f_{target}$ and the associated distance R to the target. The intermediate frequency signal 111 produced by the mixer 106 in FIG. 1 contains, consequently, target frequency components for one or more targets, from which there can be determined, in each case, the associated distance to the target.

The intermediate frequency signal 111 is filtered through a sampling low-pass filter 112, which suppresses frequency components above a limit frequency. The low-pass filtered mixer signal is sampled and digitized by an analog/digital converter 113. The sample values thus obtained are fed for evaluation to the digital signal processing unit 114, which determines the target frequency components contained in the intermediate frequency signal 111. Preferably, the digital signal processing unit 114 performs a Fourier transformation (Fast Fourier Transform, FFT) of the sample values, wherein, from the peaks of the Fourier spectrum, the target distances can then directly be determined.

For producing the frequency-modulated transmission signal 101 with a largely linear frequency curve, the high frequency source 100 includes a voltage-controlled oscillator 115 (VCO), which produces a frequency-modulated signal with a frequency in the order of magnitude of 6.5 GHz. The frequency of this signal is doubled via a frequency multiplier 116; the signal is then amplified via an amplifier 117, and, via an additional frequency multiplier 118, brought to the desired radar frequency in the order of magnitude of 78 GHz.

For producing a largely linear frequency ramp, the frequency of the voltage-controlled oscillator 115 is coupled in a phase-locked manner via a divider 119 and a phase control loop 120 (PLL, Phase-Locked Loop) to a precise frequency signal 121 which has the desired frequency behavior. The precise frequency signal 121 is made available by a DDS-chip 122 (DDS, Direct Digital Synthesis), which includes a quartz oscillator. The phase controller 120 delivers the voltage signal 123 required for the control of the frequency ramp of the voltage-controlled oscillator 115.

Via this circuit arrangement, it is achieved that the frequency ramp of the high-frequency transmission signal 101 follows the precise low-frequency frequency ramp of the DOS-chip 122 in a phase-locked manner. This fact has the result that measurements are phase-correctly reproducible at any time.

Especially due to the inertia of the phase control loop, the frequency behavior of the transmission signal 101, displays, in spite of this complex circuit arrangement, only small non-linear deviations from the ideal linear behavior.

Moreover, in the case of the radar unit shown in FIG. 1, within the mixer 106, signal over-couplings of the transmission signal component 104 occur on the input gate 124 of the mixer 106. A fraction of the transmission signal component 104 is coupled directly onto the input gate 124 of the mixer 106. A part the over-coupled signal intensity first propagates in the direction for the amplifier 110, and is then (for example, at the output of the amplifier 110) reflected back to the mixer 106. Moreover, transmission line discontinuities in the receiving branch, for example, can lead to additional signal reflections. These over-coupling effects are illustrated in FIG. 1 by an arrow 125. As a result of these over-coupling effects, in addition to the received signal, a fraction of the transmission signal component 104 also reaches the input gate 124 at which the received signal is present. This has the result that the transmission signal component 104 is multiplied in the mixer 106 with a slightly delayed image of itself. In this way, especially in the region of smaller target distances—thus in the low-frequency close-up range—disturbance signal fractions, the so-called close-range clutter, occur in the baseband.

In a form of embodiment of the present invention, these disturbance signal fractions can be lessened or suppressed by registering, first, a correction curve for correction of the low-frequency disturbance fractions. Following this, this correction curve is then subtracted from a digitized measurement signal, in order, thus, largely to remove the low-frequency disturbance fractions.

A first procedure for registering the correction curve is to register, in a largely reflection-free measuring environment, a reference signal, which has only the device-internal disturbance signal fractions and contains no target frequency components. The measuring environment is formed in such a manner, that no reflections occur which would lead to the occurrence of target frequency components. After the reference signal is registered in the specific measuring environment, it is stored, and can from then on be used as an error correction signal for the correction of the low-frequency disturbance signal fractions.

In a second procedure, a registered reference signal is subjected to a digital low-pass filtering, in order in this way to obtain an error correction signal. In this procedure, the radar measuring unit need not be measured in a specific measuring environment, but can instead remain in the normal measuring environment for registering the reference signal. In such case, the registered reference signal can, for example, contain both low-frequency disturbance signal fractions as well as also higher-frequency, target frequency components, which are caused by targets within the measuring environment. These higher-frequency, target frequency components are filtered out by the subsequent low-pass filtering. Such a low-pass filtering can be performed by means of digital signal processing. As a result of the low-pass filtering, an error correction signal is received, which includes only the low-frequency disturbance signal fractions, and which, consequently, can be drawn on for correction of the low-frequency disturbance signal fractions in the actual measurement signal.

Figure 3:
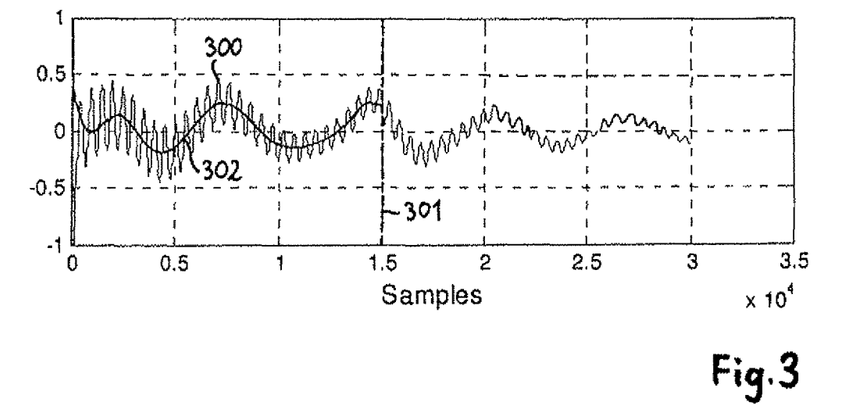
FIG. 3 shows a reference signal for the zero calibration, before and after a low-pass filtering.

FIG. 3 shows a measured, device-specific, reference curve 300 as a function of time. $1.5 \times 10^4$ sample values were measured; the remaining sample values from the dashed line 301 on were filled in by autoregressive extrapolation, in order to be later better able to perform the digital low-pass filtering. On the basis of FIG. 3, it can be recognized that the device-specific reference curve 300 has both a low-frequency disturbance signal fraction as well as a higher frequency oscillation.

Figure 4:
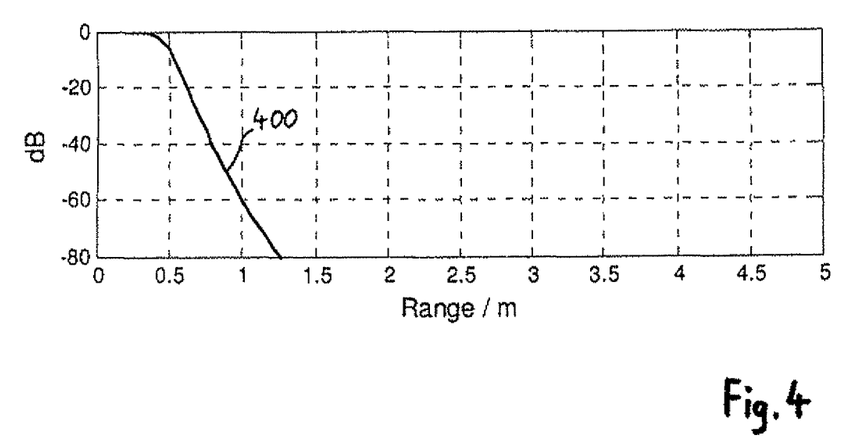
FIG. 4 shows the frequency response of a low pass filter suitable for filtering the reference curve.

Next, the reference curve 300, which comprises a sequence of sampled values, is subjected by means of digital signal processing to a low-pass filtering. FIG. 4 shows the filter characteristic curve 400 of the low-pass in decibels as a function of the distance R to the target. The upper limit frequency of the low-pass corresponds to a maximal target distance of about 0.9 m. Target frequency components of targets which are more than 0.9 m removed from the radar unit are suppressed, while target frequencies in the close-up range are let through.

In digital signal processing, various options for implementing a digital low pass filter are known. It is important that a zero phase filter is used for low-pass filtering, in order to maintain the phase relationship of the measurement signal.

A first possibility is to use a so-called FIR filter (Finite Impulse Response filter)—thus a digital filter with finite pulse response—for implementing a zero phase low-pass filter. For implementing the required low-pass, a FIR-filter of relatively high order should be used.

As an additional advantageous option, the zero phase low-pass filtering can also be performed with an IIR-filter (Infinite Impulse Response filter). For the low-pass filtering, it has proved advantageous to first perform a forward filtering and then a backward filtering with a recursive IIR-filter of low order. In order—especially in the case of the backward filtering—to prevent transients, and thus to prevent related artefacts from the transient behavior of the filter, it is advantageous to extrapolate the reference signal 300 as shown in FIG. 3 by means of autoregressive analysis, in order to thus continue the sequence of the measured sample values with additional computer-determined values. With such an extrapolation, it is achieved that the digital filter function delivers exact results throughout the total range of the measured sample values.

FIG. 3 also shows, in addition to the reference curve 300, a low-pass filtered, error correction curve 302, which was produced via low-pass filtering of the reference curve 300. In such case, a digital low-pass filter with the frequency characteristic curve shown in FIG. 4 was used. In the low-pass filtered correction curve 302, the higher-frequency, target frequency components present in the reference curve are missing. The low-pass filtered correction curve 302 includes only the low-frequency disturbance signal fractions, which could, for example, be brought about via internal over-couplings or reflections.

The thusly obtained error correction curve 302 serves for the zero calibration of a measurement curve, thus for lessening or suppressing low-frequency disturbance signal fractions in a measurement curve. In addition, the correction curve 302 is stored, and subtracted from all subsequent measurement curves. In this way, low-frequency disturbance fractions, the so-called close-range clutter, can be eliminated in the measurement curve. This enables an improved sensitivity in the evaluation of the measurement curve and especially in the determining of target frequency components in the close range, on which, in the case of previous solutions, the low-frequency disturbance fractions were superimposed.

Alternatively or supplementally to the correction of disturbance frequency fractions in the close-up range, dispersion errors, which come from amplitude and phase responses of the high frequency components as a result of not exactly linear frequency modulation of the transmission signal, and as a result of the variation of the transmission strength throughout the frequency ramp, can also be corrected with the help of suitable correction curves.

In an ideal FMCW-radar system, one would obtain as a response to an individual radar target a received signal with a single target frequency component, thus a sine signal with a constant amplitude and linearly rising phase. As a result of the above described dispersion effects, an amplitude and phase variation of the intermediate signal results, which can be described with following formula:

$$s_{TF}(t)=A_{TF}(t)\cdot \cos[S\cdot \tau \cdot t+\Phi_{TF}(t)]$$

The parameter S refers to the slope of the frequency modulation of the transmission signal and τ refers to the travel time to the target and back again. $A_{TF}(t)$ describes the amplitude variation as a function of time, while $\phi_{TF}(t)$ describes the phase variation as a function of time. In an ideal system, $A_{TF}(t)$ and $\phi_{TF}(t)$ would be constant.

Figure 5:
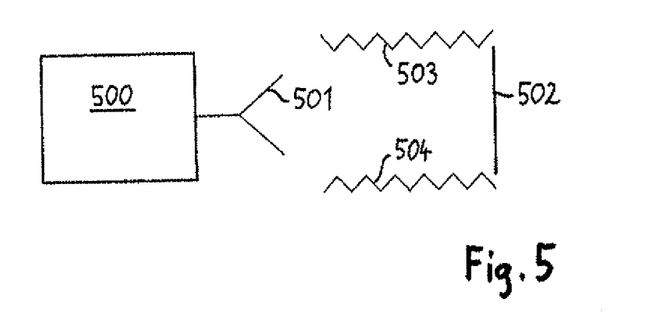
FIG. 5 a shows a measuring arrangement for registering a reference signal for the dispersion calibration.

A calibration measuring for eliminating dispersion effects is preferably performed with an individual, isolated and strong target in a low-reflection measuring environment. Such a measuring environment is shown in FIG. 5. FIG. 5 shows a radar unit 500 with an antenna 501 for radiating and receiving a frequency-modulated radar signal. The radar signal is reflected off a single, isolated target, namely off the reflector 502. The reflected signal is received by the antenna 501. The measuring environment is, moreover, equipped with absorbers 503, 504, in order to avoid other reflections off other targets. Therefore, the signal received by the radar unit 500 contains only the target frequency component caused by the reflector 502. This signal is registered by the radar unit 500 and serves as a reference signal for the dispersion correction.

Figure 6:
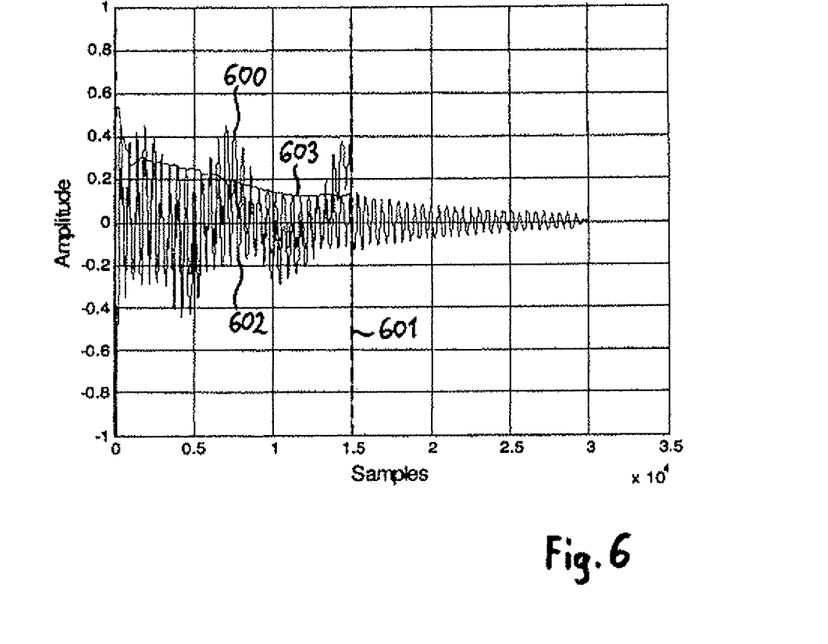
FIG. 6 shows a reference signal for the dispersion calibration, before and after the bandpass filtering.

FIG. 6 shows the thusly ascertained reference signal 600. The reference signal 600 includes 1.5×10⁴ measured sample values, which extend up to the dashed line 601. Other sample values were filled in by means of autoregressive extrapolation. The reference signal 600 includes a low-frequency disturbance component, which is caused as described above by device-internal over-couplings or reflections, as well as a high-frequency target frequency component, which originates from the single, isolated target.

Alternatively or supplementally to the use of a low-reflection measuring environment, the remote range can also be limited by means of zero phase filtering in the calibration measuring for dispersion correction. Preferably used for this is a digital bandpass filter, whose transmissive range is such that the target frequency component caused by the single, isolated target is allowed through.

Figure 7:
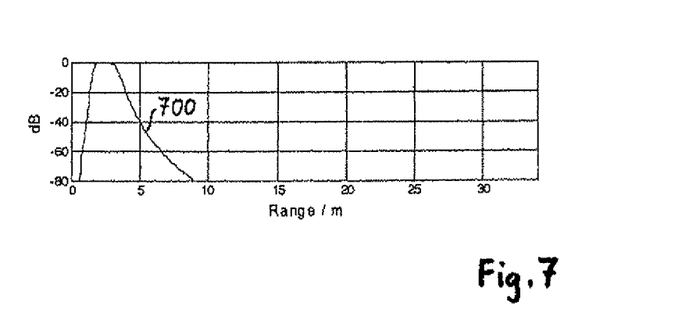
FIG. 7 shows the frequency response of a bandpass filter suitable for filtering the reference curve.

FIG. 7 shows the frequency response 700 of a suitable bandpass filter. Through the bandpass filtering, the low-frequency disturbance components contained in the reference signal 600 are filtered out. The target frequency component caused by the single, isolated target is allowed through. Frequencies above the target frequency component are suppressed.

FIG. 6 shows, in addition to the reference signal 600, also the bandpass-filtered reference signal 602, which no longer has any low-frequency disturbance fractions. In the bandpass-filtered reference signal 602, the target frequency component caused by the isolated target can be recognized, wherein the amplitude of the target frequency component slowly decreases as a function of time. This is illustrated by the envelope curve 603. The reason for this decrease in the amplitude lies in the fact that, during the frequency modulation shown in FIG. 2, the signal strength in the transmitting branch of the radar unit decreases with increasing transmission frequency. The decrease in the amplitude of the target frequency component in FIG. 6 is caused by this variation in the transmission strength over the frequency ramp.

In the case of a Hilbert transformation, a real signal is converted into a complex signal, in that there is added to the real signal, as an imaginary part, the real part, phase-shifted by 90° and multiplied by i. Obtained by means of a Hilbert transformation from the real signal $s_{TF}(t)$ is the so-called analytical signal $s_{TF}^a(t)$:

$$s_{TF}^a(t)=A_{TF}(t)\cdot e^{i\cdot[S\cdot \tau \cdot t+\phi_{TF}(t)]}$$

After splitting off the linear phase term, a complex envelope curve $env_{ZF}^a(t)$ of the amplitude and phase variation is obtained, which describes the device-specific dispersion effects:

$$env_{TF}^a(t)=A_{TF}(t)\cdot e^{i\cdot \phi_{TF}(t)}$$

The amplitude term $A_{TF}(t)$ describes the amplitude variation of the intermediate signal as a function of time. This amplitude variation is first and foremost caused by the fact that the strength of the transmission signal produced by the radar unit during the frequency modulation shown in FIG. 2 varies.

The phase term $e^{i\cdot \phi_{ZF}(t)}$ describes the deviation of the phase of the intermediate signal from the ideal behavior. The phase variation $\phi_{TF}(t)$ is, on the one hand, caused by non-linear deviations from the ideally linear frequency ramp of the transmission signal. Such non-linear deviations occur also as a result of the complex implementation of the high frequency source 100 shown in FIG. 1. Furthermore, phase deviations are also brought about by the frequency responses of the components used in the radar unit.

This complex valued envelope curve $env_{TF}^a(t)$ can be used for correction of the device-internally caused dispersion effects. For this purpose, all subsequent measurements are divided by this term $env_{TF}^a(t)$ in order to thus compensate for the device-internally caused amplitude and phase variations.

Figure 8A:
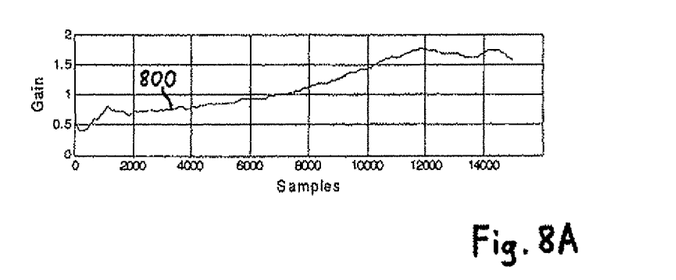
FIG. 8 shows an amplitude correction signal and a phase correction signal for the compensation of amplitude and phase variations of the intermediate signal.

For this, the complex envelope curve can be separated into an amplitude correction signal for correction of the amplitude variation and a phase correction signal for correction of the phase variation of the intermediate signal. FIG. 8A shows an amplitude correction signal 800, which is derived from the reference signal 602, and which, for canceling the amplitude variation, can be multiplied with a registered measurement signal. In order to compensate for the lessening of the amplitude recognizable in FIG. 6, in the amplitude correction signal 800, a corresponding rise can be recognized.

Figure 8B:
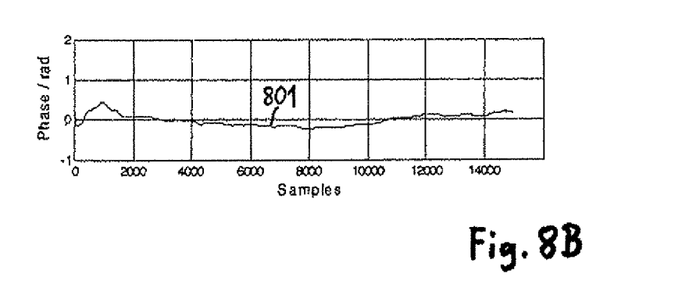

FIG. 8B shows a phase correction signal 801 derived from the reference signal 602, wherein the phase correction (in rad) is plotted as a function of time. Through application of this correction phase to a registered measurement signal, the phase of the measurement signal can be corrected for device-internally caused non-linearities. In this way, a linearizing of the phase of the measurement signal is achieved.

Figure 9A:
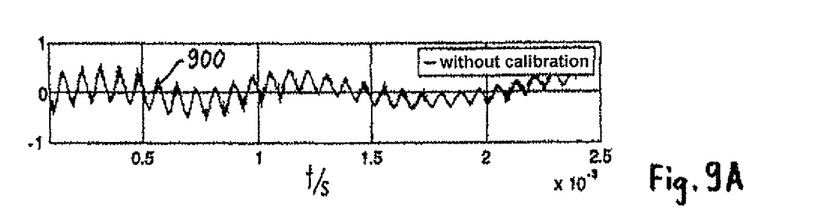
FIG. 9 shows a measurement signal as well, as a frequency spectrum of the measurement signal, before and after performing various corrections.
Figure 9B:
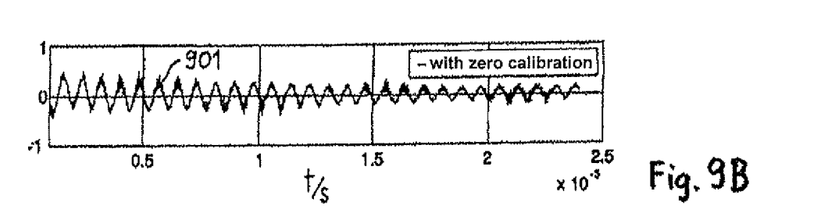
Figure 9C:
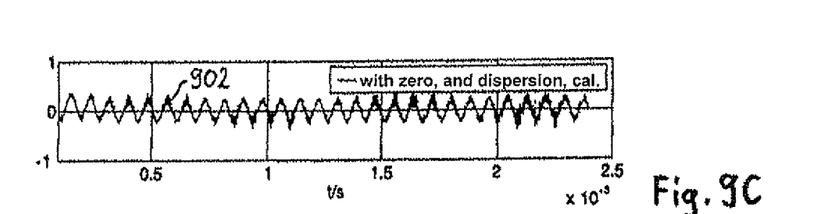

The correction for suppressing the close range disturbance signal fractions and the dispersion correction can be performed one after the other, in order thus to achieve an improving of the signal quality of a measurement signal. This is presented in FIGS. 9A to 9C. FIG. 9A shows as a function of time the digitized measurement signal 900 delivered by the analog/digital converter, wherein the low-frequency disturbance signal fractions can clearly be recognized. By subtraction of an error correction signal, which includes only the close-range disturbance signal fractions, the signal 901 shown in FIG. 9B is obtained. In the case of the signal 901, a sinking of the signal amplitude is to be recognized; moreover, the signal 901 includes non-linearities of phase. Next, this amplitude and phase variation is eliminated, in that the signal 901 is multiplied with corresponding amplitude and phase correction curves. As a result, the corrected signal 903 shown in FIG. 9C, which has a largely constant amplitude as well as a linearly rising phase, is obtained.

Figure 9D:
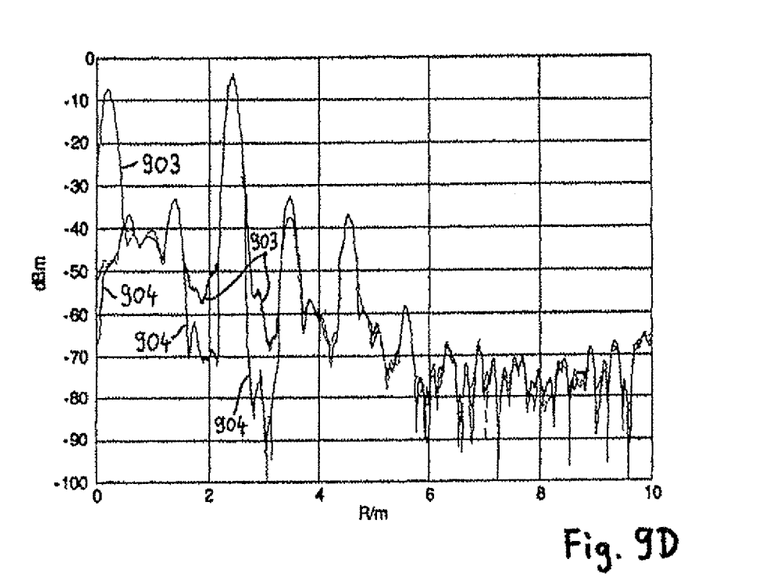

In FIG. 9D, the associated frequency spectra for the signals 900, 901 and 902 are shown. As a result of the zero calibration, in the low-frequency spectral range, in the case of a comparison of the curve 903 before the correction and the curve 904 after the correction, a clear reduction of the low-frequency disturbance signal fraction is to be seen; the close-range clutter is reduced by up to 40 dB.

The dispersion calibration has in the frequency range the effect, that the point scatter function is visibly narrower and more symmetrical. In the case of a comparison of the curve 903 before the dispersion correction and the curve 904 after the correction, a reduction of the side lobes by about 15 dB can be recognized in the region around the strong target at 2.5 m.

The invention claimed is:

1. A method for lessening disturbances of a measurement signal in a radar unit for distance measurement by means of frequency modulated radar in continuous wave operation, comprising the steps of:

registering in a reference measurement a reference signal as a function of time;

deriving an error correction signal from the registered reference signal, wherein the error correction signal predominantly comprises spectral components, which are caused or influenced by device-specific defects of the radar unit;

registering a measurement signal; and correcting the measurement signal in accordance with the error correction signal by means of digital signal processing, wherein:

the method is applied for lessening close-range disturbance signal fractions;

the error correction signal has close-range disturbance signal fractions but no target frequency components;

the corrected measurement signal with a lessened part of close-range disturbance signal fractions is produced by subtraction of the error correction signal from the measurement signal; and at least one of the following features are included: the reference signal is filtered by means of a zero phase, low-pass filter; the reference signal is filtered by means of a digital IIR filter with unlimited pulse response; the error correction signal is produced from the reference signal by first a forward filtering and then a backward filtering of the registered reference signal; and before performing a digital filtering, registered digital sample values of the reference signal are supplemented by other sample values by means of autoregressive extrapolation.

2. The method as claimed in claim 1, wherein:

the frequency components of the reference signal are limited by means of digital low-pass filtering to a close range within a predetermined maximum distance.

3. The method as claimed in 1, wherein:

close-range disturbance signal fractions are disturbance signal fractions which are brought about by internal over-coupling or reflections within the radar unit.

4. The method as claimed in claim 1, wherein:

the reference signal is registered in a largely reflection-free measuring environment.

\* \* \* \* \*